United States Patent
Oguri et al.

(10) Patent No.: US 8,762,034 B2
(45) Date of Patent: Jun. 24, 2014

(54) PARTICULATE MATTER DEPOSITION AMOUNT ESTIMATION DEVICE, EXHAUST GAS PURIFICATION SYSTEM, AND PARTICULATE MATTER DEPOSITION AMOUNT ESTIMATION METHOD

(75) Inventors: Hideo Oguri, Oyama (JP); Akikazu Miyahara, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/976,620

(22) PCT Filed: Feb. 23, 2012

(86) PCT No.: PCT/JP2012/054455
§ 371 (c)(1),
(2), (4) Date: Jun. 27, 2013

(87) PCT Pub. No.: WO2012/127973
PCT Pub. Date: Sep. 27, 2012

(65) Prior Publication Data
US 2013/0269323 A1    Oct. 17, 2013

(30) Foreign Application Priority Data
Mar. 18, 2011    (JP) .................................. 2011-061722

(51) Int. Cl.
*F01N 3/02*    (2006.01)
*F01N 11/00*    (2006.01)
*B01D 46/42*    (2006.01)

(52) U.S. Cl.
USPC ............................................ 701/114; 60/276

(58) Field of Classification Search
USPC ............ 701/114, 102, 108, 109, 115; 60/276, 60/277, 285, 286, 297, 301
See application file for complete search history.

(56) References Cited

U.S. PATENT DOCUMENTS 6,907,873 B2 *    6/2005    Hamahata ...................... 701/108
7,310,941 B2 *    12/2007   Kuboshima et al. ............ 60/297

(Continued)

FOREIGN PATENT DOCUMENTS

CN    101688451 A    3/2010
EP    2163740 A1     3/2010

(Continued)

OTHER PUBLICATIONS

International Search Report dated May 22, 2012, issued for PCT/JP2012/054455.

(Continued)

*Primary Examiner* — Hieu T Vo
(74) *Attorney, Agent, or Firm* — Edwards Wildman Palmer LLP

(57) ABSTRACT

There are provided calculating a differential pressure deposition amount of PM deposited in a DPF based on an exhaust gas flow rate and a differential pressure of the DPF, calculating a model deposition amount of the PM using a model in which a PM amount burned in the DPF is subtracted from the PM amount, calculating a time change rate of the differential pressure deposition amount, and setting a first coefficient to be larger than a second coefficient when the exhaust gas flow rate exceeds a predetermined value and setting the first coefficient to be small when the exhaust gas flow rate exceeds the predetermined value and the time change rate is a predetermined threshold or more when multiplying the differential pressure deposition amount and the model deposition amount by the first and second coefficients, respectively, and calculating an addition value of the respective multiplied values as the PM deposition amount.

7 Claims, 9 Drawing Sheets

(56) References Cited

U.S. PATENT DOCUMENTS

| | | | |
|---|---|---|---|
| 7,891,176 B2* | 2/2011 | Konstandopoulos | 60/297 |
| 8,286,420 B2* | 10/2012 | Ide | 701/115 |
| 2004/0260452 A1 | 12/2004 | Hamahata | |
| 2006/0179826 A1 | 8/2006 | Kuboshima et al. | |
| 2010/0319319 A1 | 12/2010 | Ide | |

FOREIGN PATENT DOCUMENTS

| | | |
|---|---|---|
| EP | 2216521 A1 | 8/2010 |
| JP | 2004-076589 A | 3/2004 |
| JP | 2004-293413 A | 10/2004 |
| JP | 2006-226119 A | 8/2006 |
| JP | 2009-185781 A | 8/2009 |
| JP | 2009-257323 A | 11/2009 |
| JP | 2010-180852 A | 8/2010 |

OTHER PUBLICATIONS

Office Action dated Feb. 24, 2014, issued for the German Patent Application No. 11 2012 001 284.4 and English translation thereof.

* cited by examiner

US 8,762,034 B2

PARTICULATE MATTER DEPOSITION AMOUNT ESTIMATION DEVICE, EXHAUST GAS PURIFICATION SYSTEM, AND PARTICULATE MATTER DEPOSITION AMOUNT ESTIMATION METHOD

FIELD

The present invention relates to a particulate matter deposition amount estimation device which estimates a PM deposition amount inside a DPF (Diesel Particulate Filter) when regeneration the DPF that removes a particulate matter (PM: Particulate Matter) included in an exhaust gas of an engine, an exhaust gas purification system using the same, and a particulate matter deposition amount estimation method.

BACKGROUND

In a diesel engine, a DPF is provided in an exhaust pipe line so as to reduce PM included in an exhaust gas. The DPF traps PM such as soot included in an exhaust gas and discharges the exhaust gas of which the PM is reduced to external air. When the PM trapped by the DPF increases in amount, a filter function degrades. For this reason, the DPF is regenerated by burning the trapped PM. The regeneration includes natural regeneration in which the deposited PM is naturally burned when the temperature of the exhaust gas is high and forced regeneration which is performed when a PM deposition amount exceeds a predetermined reference value. In the forced regeneration, the engine operation state is adjusted so as to increase the exhaust gas temperature and external dosing for injecting a fuel at the front stage of the DPF or internal dosing for injecting a fuel into a cylinder of the engine is performed so as to forcedly burn the PM. The forced regeneration further includes automatic forced regeneration and manual forced regeneration. When there is a possibility that the DPF may be blocked due to the PM deposition amount which becomes larger than a reference value in the automatic forced regeneration, an alarm for prompting the execution of the manual forced regeneration is notified to a driver.

Here, since the PM deposition amount of the PM trapped in the DPF may not be actually measured during the operation of the engine, the PM deposition amount is calculated by the estimation. For example, Patent Literature 1 discloses a DPF deposition amount estimation device that includes a PM discharge amount model of which a PM discharge amount is set by an engine operation state, a PM regeneration amount model of which a PM regeneration amount is set by a temperature difference between an outlet temperature and an inlet temperature of a DPF, and a DPF differential pressure model of which a PM deposition amount is set from an exhaust gas flow rate and a differential pressure of the DPF and calculates a PM deposition estimation amount of the DPF by adding a PM deposition correction amount correcting an estimation value of the DPF differential pressure model using a coefficient K set in accordance with an engine speed and an engine fuel injection amount to a difference between the PM discharge amount and the PM regeneration amount.

Further, Patent Literature 2 discloses an exhaust gas purification system which obtains a time change rate of a PM production amount using a PM production amount estimation model equation as a mathematical model calculating the PM production amount from an engine speed, a fuel flow rate, and a DPF differential pressure change rate as a time change rate of a differential pressure before and after a DPF, obtains a time change rate of a PM purification amount using a PM purification amount estimation model equation of a mathematical model calculating the PM purification amount, and estimates a PM accumulation amount of the DPF from the time change rate of the PM production amount, the time change rate of the PM purification amount, and the trapping rate of the DPF.

CITATION LIST

Patent Literature

Patent Literature 1: Japanese Patent Application Laid-open No. 2009-185781
Patent Literature 2: Japanese Patent Application Laid-open No. 2004-293413

SUMMARY

Technical Problem

Incidentally, as illustrated in the upper stage of FIG. 13, PM 101 trapped inside a cell constituting a DPF is uniformly deposited inside the cell, but when the amount of the PM 101 increases, it is observed that the PM 101 deposited inside the cell is detached at some positions and the cell is blocked by a detached PM 102 as illustrated in the lower stage of FIG. 13.

Here, when the PM deposition amount is estimated by using the differential pressure as in Patent Literature 1, a problem arises when the cell is blocked. That is, when the PM deposition amount is estimated by using the differential pressure in a case where the cell is blocked, the PM estimation amount becomes larger than the actual PM deposition amount. For this reason, there is a problem in which an alarm for prompting the execution of the manual forced regeneration is generated even though the PM is not actually deposited by the amount in which the manual forced regeneration is needed.

The invention is made in view of the above-described circumstances, and it is an object of the invention to provide a particulate matter deposition amount estimation device capable of estimating a PM deposition amount with high precision, an exhaust gas purification system using the same, and a particulate matter deposition amount estimation method.

Solution to Problem

To overcome the problems and achieve the object, according to the present invention, a particulate matter deposition amount estimation device comprises: a differential pressure deposition amount calculating unit which calculates a differential pressure deposition amount obtained by estimating a deposition amount of a particulate matter in a particulate matter removing filter removing the particulate matter from an exhaust gas of an engine based on an exhaust gas flow rate and a differential pressure between an inlet side and an outlet side of the particulate matter removing filter; a model deposition amount calculating unit which calculates a model deposition amount obtained by estimating the deposition amount of the particulate matter in the particulate matter removing filter using a model in which an amount of the particulate matter burned in the particulate matter removing filter is subtracted from the amount of the particulate matter in the exhaust gas input to the particulate matter removing filter; a differential pressure deposition amount change rate calculating unit which calculates a time change rate of the differential pressure deposition amount; and a particulate matter deposition amount calculating unit which sets a value of a first coefficient to be larger than a value of a second coefficient when the exhaust gas flow rate exceeds a predetermined value and sets the set first coefficient to be small when the exhaust gas flow rate exceeds the predetermined value and the time change rate of the differential pressure deposition amount is a predetermined threshold value or more as a condition in which a sum of the first coefficient and the second coefficient becomes a constant value to calculate the deposition amount of the particulate matter, when the particulate matter deposition amount calculating unit calculates an addition value of a value obtained by multiplying the differential pressure deposition amount by the first coefficient and a value obtained by multiplying the model deposition amount by the second coefficient as the deposition amount of the particulate matter.

According to the present invention, the particulate matter deposition amount calculating unit sets the sum of the first coefficient and the second coefficient to 1, sets the value of the first coefficient to 1 when the exhaust gas flow rate exceeds the predetermined value, and sets the value of the first coefficient to 0 when the exhaust gas flow rate does not exceed the predetermined value.

According to the present invention, the particulate matter deposition amount calculating unit decreases the set first coefficient with an increase in the time change rate of the differential pressure deposition amount when the exhaust gas flow rate exceeds the predetermined value and the time change rate of the differential pressure deposition amount is the predetermined threshold value or more.

According to the present invention, the particulate matter deposition amount calculating unit outputs an instruction to perform manual forced regeneration to the particulate matter removing filter when the calculated deposition amount of the particulate matter exceeds a threshold value.

According to the present invention, an exhaust gas purification system comprises: a particulate matter removing filter which removes a particulate matter from an exhaust gas of an engine; an engine control unit which controls the engine; a regeneration control unit which controls regeneration of the particulate matter removing filter; a differential pressure sensor which detects a differential pressure between an inlet side and an outlet side of the particulate matter removing filter; and a regeneration instruction unit which outputs an instruction to perform manual forced regeneration to the particulate matter removing filter, wherein the regeneration control unit includes a differential pressure deposition amount calculating unit which calculates a differential pressure deposition amount obtained by estimating a deposition amount of the particulate matter in the particulate matter removing filter based on the differential pressure and an exhaust gas flow rate input from the engine control unit, a model deposition amount calculating unit which calculates a model deposition amount obtained by estimating the deposition amount of the particulate matter in the particulate matter removing filter using a model in which an amount of the particulate matter burned in the particulate matter removing filter is subtracted from the amount of the particulate matter in the exhaust gas input to the particulate matter removing filter, a differential pressure change rate calculating unit which calculates a time change rate of the differential pressure deposition amount, and a particulate matter deposition amount calculating unit which sets a value of a first coefficient to be larger than a value of a second coefficient when the exhaust gas flow rate exceeds a predetermined value and sets the set first coefficient to be small when the exhaust gas flow rate exceeds the predetermined value and the time change rate of the differential pressure deposition amount is a predetermined threshold value or more as a condition in which a sum of the first coefficient and the second coefficient becomes a constant value to calculate the deposition amount of the particulate matter, when the particulate matter deposition amount calculating unit calculates an addition value of a value obtained by multiplying the differential pressure deposition amount by the first coefficient and a value obtained by multiplying the model deposition amount by the second coefficient as the deposition amount of the particulate matter, wherein the particulate matter deposition amount calculating unit outputs an instruction to perform the manual forced regeneration to the regeneration instruction unit when the calculated deposition amount of the particulate matter exceeds a threshold value.

According to the present invention, the regeneration control unit performs the manual forced regeneration through the engine control unit when receiving a manual forced regeneration performing instruction from the regeneration instruction unit.

According to the present invention, a particulate matter deposition amount estimation method comprises: calculating a differential pressure deposition amount obtained by estimating a deposition amount of a particulate matter in a particulate matter removing filter removing the particulate matter from an exhaust gas of an engine based on an exhaust gas flow rate and a differential pressure between an inlet side and an outlet side of the particulate matter removing filter; calculating a model deposition amount obtained by estimating the deposition amount of the particulate matter in the particulate matter removing filter using a model in which an amount of the particulate matter burned in the particulate matter removing filter is subtracted from the amount of the particulate matter in the exhaust gas input to the particulate matter removing filter; calculating a time change rate of the differential pressure deposition amount; and setting a value of a first coefficient to be larger than a value of a second coefficient when the exhaust gas flow rate exceeds a predetermined value and setting the set first coefficient to be small when the exhaust gas flow rate exceeds the predetermined value and the time change rate of the differential pressure deposition amount is a predetermined threshold value or more as a condition in which a sum of the first coefficient and the second coefficient becomes a constant value to calculate the deposition amount of the particulate matter, when calculating an addition value of a value obtained by multiplying the differential pressure deposition amount by the first coefficient and a value obtained by multiplying the model deposition amount by the second coefficient as the deposition amount of the particulate matter.

Advantageous Effects of Invention

According to the invention, it is possible to estimate the particulate matter deposition amount with high precision since the particulate matter deposition amount is calculated so that a value of a first coefficient is set to be larger than a value of a second coefficient when the exhaust gas flow rate exceeds a predetermined value and the set first coefficient is set to be small when the exhaust gas flow rate exceeds the predetermined value and the time change rate of the differential pressure deposition amount is a predetermined threshold value or more when an addition value of a value obtained by multiplying the differential pressure deposition amount by the first coefficient and a value obtained by multiplying the model deposition amount by the second coefficient is calculated as the particulate matter deposition amount as a condition in which the sum of the first coefficient and the second coefficient becomes a constant value. Accordingly, it is possible to prevent a problem in which an erroneous alarm is generated to prompt the execution of the manual forced regeneration when the differential pressure rapidly increases regardless of the actual particulate matter deposition amount so that the estimated particulate matter deposition amount considerably increases as in the case where the cell inside the DPF is blocked.

DESCRIPTION OF EMBODIMENTS

Hereinafter, an embodiment of the invention will be described by referring to the accompanying drawings.

Figure 1:
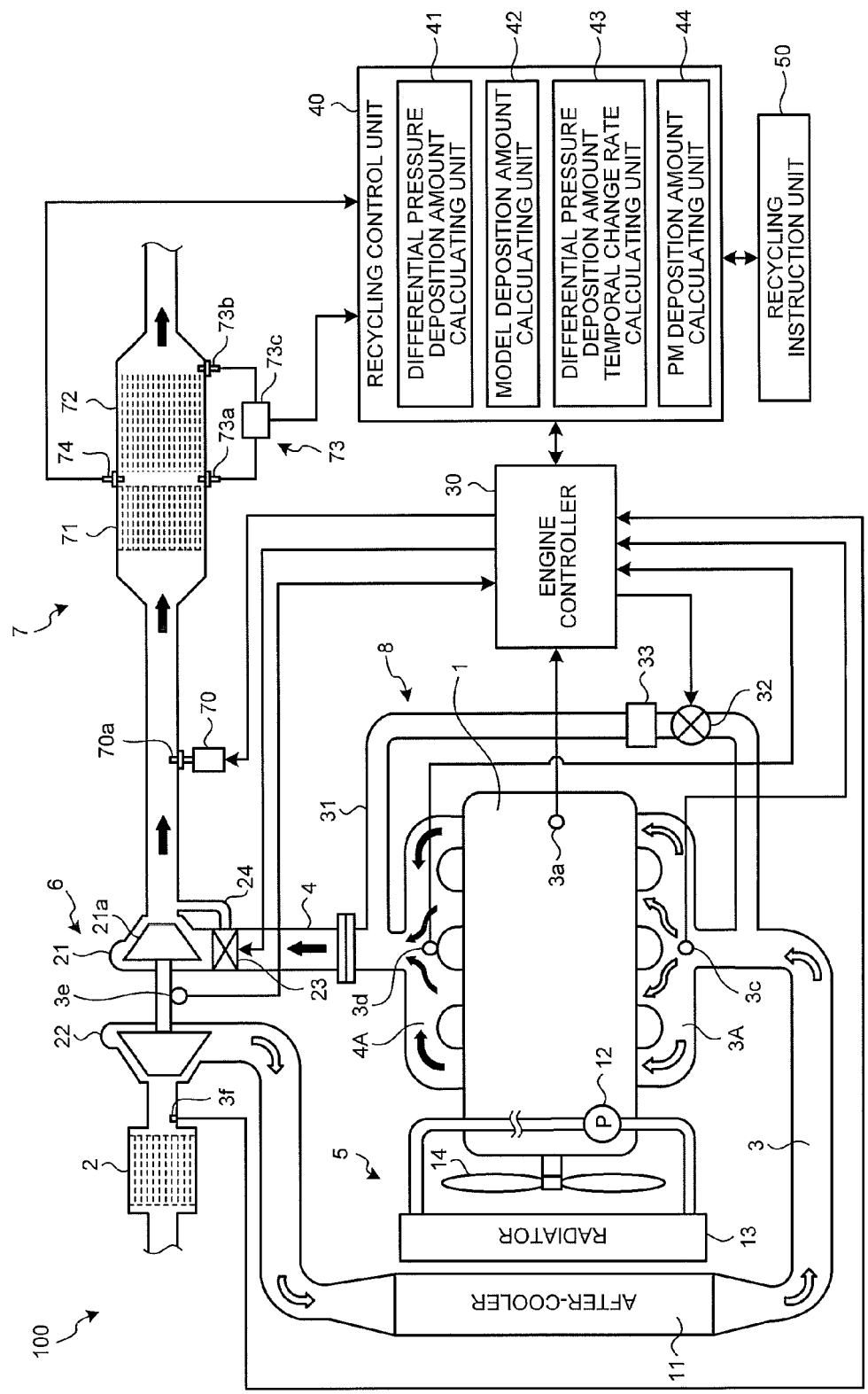
FIG. 1 is a schematic diagram illustrating an outline configuration of a diesel engine which includes an exhaust gas purification system according to an embodiment of the invention.

FIG. 1 is a schematic diagram illustrating an outline configuration of a diesel engine 100 which includes an exhaust gas purification system according to the embodiment of the invention. In FIG. 1, the diesel engine 100 includes an engine body 1 which has therein a plurality of combustion chambers, an air cleaner 2 which filters supplied air by using a filter and prevents foreign matter such as dust from being mixed into a combustion chamber, an intake pipe line 3 which supplies supplied air to each combustion chamber inside the engine body 1, an exhaust pipe line 4 which discharges an exhaust gas discharged from each combustion chamber inside the engine body 1, a cooling mechanism 5, an exhaust turbine supercharger 6, an exhaust gas purification device 7, an exhaust gas recirculation system 8, an engine controller 30, a regeneration control unit 40, and a regeneration instruction unit 50.

An intake manifold 3A is attached between the engine body 1 and the intake pipe line 3 so that the air supplied from the intake pipe line 3 is distributed to each combustion chamber inside the engine body 1. An exhaust manifold 4A is attached between the engine body 1 and the exhaust pipe line 4 so that an exhaust gas discharged from each combustion chamber inside the engine body 1 collectively flows into the exhaust pipe line 4.

The intake pipe line 3 is provided with an after-cooler 11 which cools air compressed by the exhaust turbine supercharger 6. The cooling mechanism 5 includes a pump 12 which is driven by a crank shaft (not illustrated) inside the engine body 2. Cooling water which is pressure-fed by the pump 12 cools a portion such as the engine body 1, the exhaust turbine supercharger 6, and an oil cooler (not illustrated) which need to be cooled, and is air-cooled by a radiator 13 provided in the cooling mechanism 5. The after-cooler 11 and the radiator 13 are provided in the engine body 1, and the cooling action thereof is promoted by a fan 14 which is rotationally driven by the crank shaft (not illustrated).

The exhaust turbine supercharger 6 includes a turbine 21 which is provided in the course of the exhaust pipe line 4, a compressor 22 which is provided in the course of the intake pipe line 3 and is driven while being connected to the turbine 21, and a variable turbo nozzle 23 which controls a flow rate of an exhaust gas supplied to the turbine 21. The exhaust turbine supercharger 6 controls the engine speed of the turbine 21 by controlling the opening degree of the variable turbo nozzle 23. The compressor 22 is driven by the rotation of the turbine 21 so as to supercharge the air supplied to the engine body 1. Furthermore, when the variable turbo nozzle 23 is fully closed, the exhaust gas is discharged to the exhaust gas purification device 7 through a bypassing passageway 24. That is, when the variable turbo nozzle 23 is opened, the exhaust gas is supplied to a turbine rotor 21a. When the variable turbo nozzle 23 is fully closed, the exhaust gas is output to the exhaust gas purification device 7 through the bypassing passageway 24 and the load on the turbine rotor 21a decreases so as to increase the exhaust gas temperature.

The exhaust gas purification device 2 is provided at the downstream side of the turbine 21 so as to remove the PM included in the exhaust gas, and includes a DOC (diesel oxidation catalyst) 71, a DPF 72, a differential pressure sensor 73, and a temperature sensor 74. The DOC 71 and the DPF 72 are provided inside a cylindrical exhaust pipe line, where the DOC 71 is provided at the upstream side of the exhaust pipe line and the DPF 72 is provided at the downstream side of the exhaust pipe line. Further, a dosing nozzle 70a which injects a dosing fuel supplied from a dosing fuel supply device 70 is disposed between the turbine 21 and the exhaust gas purification device 7. The injection of the dosing fuel is performed when there is a forced regeneration instruction.

The DOC 71 is realized by Pt or the like, and removes CO (carbon monoxide) and HC (hydrocarbon) included in the exhaust gas and SOF (organic soluble component) included in the PM by oxidization. Further, the DOC 21 changes NO (nitrogen monoxide) included in the exhaust gas into $NO_2$ (nitrogen dioxide) by oxidization, and oxidizes the dosing fuel injected from the dosing nozzle 70a so as to increase the exhaust gas temperature.

The DPF 72 traps the PM. The DPF 72 is realized by using silicon carbide or the like as a base. The PM included in the exhaust gas is trapped when passing through a microscopic hole formed in the DPF 72. Then, as illustrated in FIG. 1, the DPF 72 has a configuration in which cells having microscopic flow passages in the exhaust gas flow direction are tightly arranged inside the cylindrical exhaust pipe line. Then, a wall flow DPF is employed in which a cell having a sealed upstream end and a cell having a sealed downstream end are alternately arranged. The trapped PM is oxidized (burned) by the oxygen included in the exhaust gas and $NO_2$ produced by the DOC 71 as a condition in which the temperature reaches the temperature causing the oxidization reaction of the exhaust gas.

The differential pressure sensor 73 includes a pressure sensor 73*a* which is disposed at the upstream side of the DPF 72 so as to detect the upstream pressure of the DPF 72, a pressure sensor 73*b* which is disposed at the downstream side of the DPF 72 so as to detect the downstream pressure of the DPF 72, and a differential pressure detector 73*c* which outputs a differential pressure obtained by subtracting the pressure detected by the pressure sensor 73*b* from the pressure detected by the pressure sensor 73*a* to the regeneration control unit 40.

The temperature sensor 74 is disposed at the upstream side of the DPF 72 so as to detect the exhaust gas temperature of the inlet of the DPF 72 and outputs the detection result as the DPF temperature to the regeneration control unit 40.

The exhaust gas recirculation system 8 includes an exhaust gas recirculation passageway 31 which causes the exhaust manifold 4A and the intake pipe line 3 to communicate with each other. The exhaust gas recirculation passageway 31 extracts a part of the exhaust gas from the exhaust manifold 4A and re-circulates the exhaust gas to the intake pipe line 3. The exhaust gas recirculation passageway 31 is provided with an EGR valve 32 which opens and closes the exhaust gas recirculation passageway 31 and an EGR cooler 33 which cools the exhaust gas from the exhaust manifold 4A. The exhaust gas recirculation system 8 causes a part of the exhaust gas to flow back to the intake manifold 3A through the exhaust gas recirculation passageway 31 so as to decrease the oxygen concentration in the supplied air, and decreases the combustion temperature of the engine body 1. Accordingly, it is possible to decrease the amount of nitrogen oxide included in the exhaust gas.

Here, the diesel engine 100 includes an engine speed sensor 3*a*, an intake pressure sensor 3*c*, an exhaust pressure sensor 3*d*, a turbine rotation speed sensor 3*e*, and a flow rate sensor 3*f* as a control system. The engine speed sensor 3*a* detects the rotation speed of the crank shaft (not illustrated) of the engine body 1, and inputs a signal representing the rotation speed of the crank shaft (not illustrated) to the engine controller 30.

The intake pressure sensor 3*c* detects the intake pressure between the outlet passageway of the compressor 22 and the intake manifold 3A, and inputs the detection result to the engine controller 30. The exhaust pressure sensor 3*d* detects the exhaust pressure between the exhaust manifold 4A and the inlet passageway of the turbine 21, and inputs a signal representing the exhaust pressure to the engine controller 30. A turbine rotation speed sensor 4*e* detects the rotation speed of the turbine 21, and inputs a signal representing the rotation speed of the turbine 21 to the engine controller 30.

The engine controller 30 controls the engine speed or the torque by adjusting the fuel injection amount, the fuel injection timing, the EGR valve 32, and the variable turbo nozzle 23 in response to the input value of the input unit corresponding to the operator's demand for an accelerator pedal (not illustrated) and increases the exhaust gas temperature by adjusting the fuel injection amount, the fuel injection timing, the EGR valve 32, and the variable turbo nozzle 23 in accordance with the instruction from the regeneration control unit 40. Then, the engine controller controls the forced regeneration by injecting the dosing fuel from the dosing nozzle 70*a*. In particular, the engine controller 30 increases the exhaust gas temperature by suppressing the fuel injection amount and closing each of the EGR valve 32 and the variable turbo nozzle 23 when the forced regeneration is controlled.

The regeneration control unit 40 includes a differential pressure deposition amount calculating unit 41, a model deposition amount calculating unit 42, a differential pressure deposition amount time change rate calculating unit 43, and a PM deposition amount calculating unit 44. The regeneration control unit 40 estimates the PM deposition amount in the DPF 72 based on the exhaust gas flow rate information, the PM production amount information, and the PM combustion amount information obtained from the engine controller 30, the differential pressure obtained from the differential pressure sensor 73, and the DPF temperature obtained from the temperature sensor 74, and notifies the PM deposition amount to the regeneration instruction unit 50 when the PM deposition amount exceeds a predetermined threshold value. Further, the regeneration control unit 40 causes the engine controller 30 to perform the manual forced regeneration when there is a manual regeneration instruction from the regeneration instruction unit 50. Further, when the manual forced regeneration ends, the state is notified to the regeneration instruction unit 50.

The regeneration instruction unit 50 is provided in a display panel provided near a driver seat so that an input/output operation may be performed. The regeneration instruction unit displays an alarm for prompting the manual regeneration instruction when there is a notification from the regeneration control unit 40, and outputs the manual regeneration instruction to the regeneration control unit 40 when the manual regeneration instruction is performed. Further, when the end of the manual forced regeneration instruction is notified, the regeneration instruction unit 50 displays the state.

Figure 2:
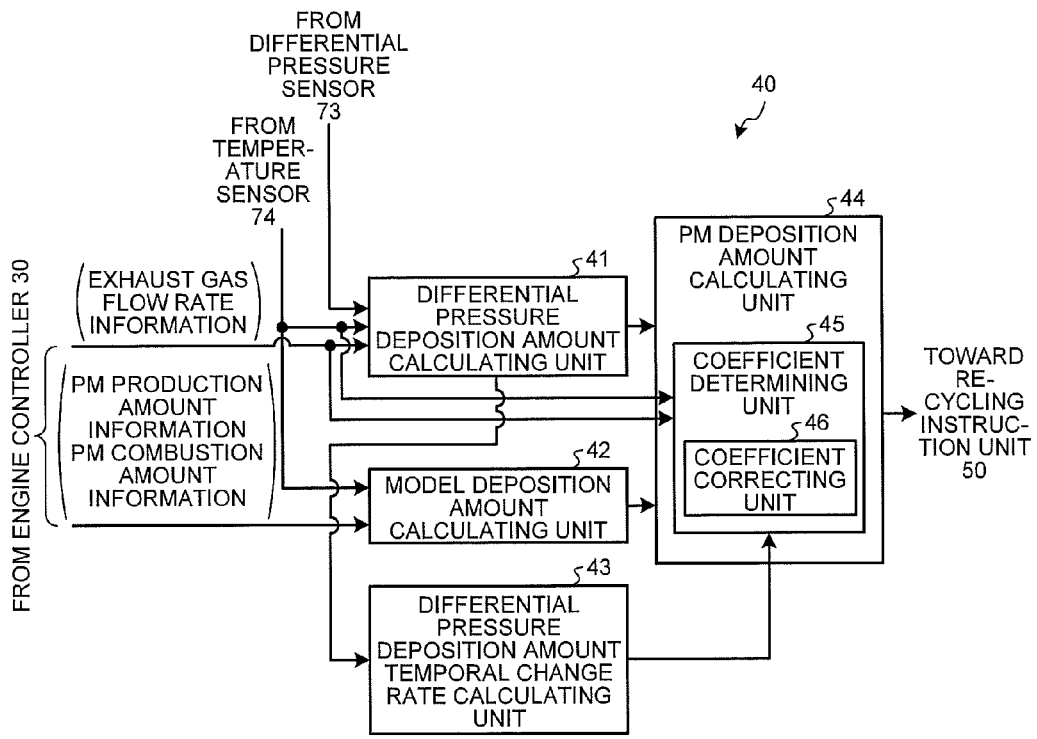
FIG. 2 is a block diagram illustrating a configuration of a regeneration control unit illustrated in FIG. 1.

Here, a regeneration control process which is performed by the regeneration control unit 40 will be described. FIG. 2 is a block diagram illustrating a detailed configuration of the regeneration control unit 40. In FIG. 2, the differential pressure deposition amount calculating unit 41 receives the differential pressure of the DPF 72 from the differential pressure sensor 73, the DPF temperature from the temperature sensor 74, and the exhaust gas flow rate information from the engine controller 30. The exhaust gas flow rate information is the exhaust gas volume flow rate input to the DPF 72. The engine controller 30 outputs the mass flow rate obtained by adding the supplied air mass flow rate detected by the flow rate sensor 3*f* to the exhaust mass flow rate estimated from the fuel injection amount detected by a fuel injection amount sensor 3*b* to the differential pressure deposition amount calculating unit 41. Then, the differential pressure deposition amount calculating unit 41 converts the exhaust gas flow rate input from the engine controller 30 into the exhaust gas volume flow rate based on the DPF temperature input from the temperature sensor 74.

Figure 3:
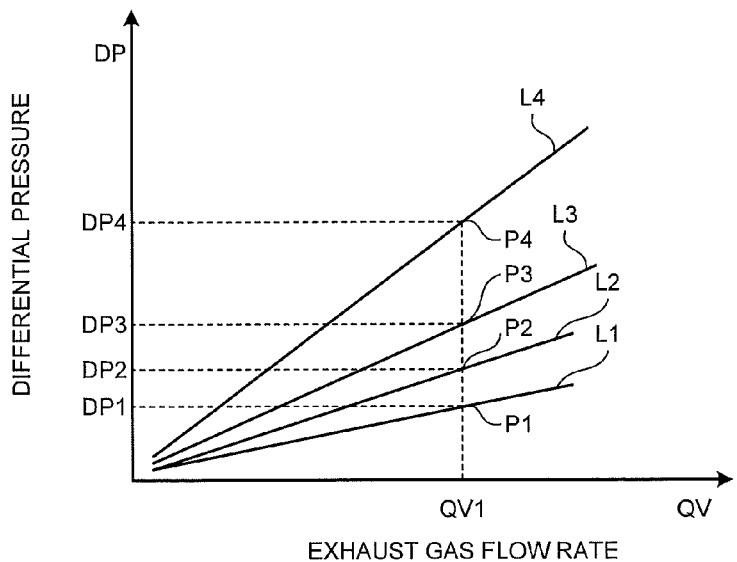
FIG. 3 is a diagram illustrating a relation between a differential pressure and an exhaust gas flow rate using a PM deposition amount as a parameter.

The differential pressure deposition amount calculating unit 41 includes a three-dimensional map representing a relation among the converted exhaust gas flow rate, the differential pressure, and the PM deposition amount, and outputs the PM deposition amount by using the converted exhaust gas flow rate and the differential pressure as the input values. FIG. 3 is a diagram illustrating a relation between the exhaust gas flow rate and the differential pressure by using the PM deposition amount as a parameter. When the exhaust gas flow rate is constant, the PM deposition amount increases with an increase in the differential pressure. Further, when the differential pressure is constant, the PM deposition amount decreases with an increase in the exhaust gas flow rate. For example, as illustrated in FIG. 3, when the exhaust gas flow rate is indicated by QV1 and the differential pressure is indicated by DP1 to DP4, the respective PM deposition amounts become P1 to P4. That is, in the PM deposition amount, P4 is larger than P1. Then, the differential pressure deposition amount calculating unit 41 outputs the estimated PM deposition amount as the differential pressure deposition amount PMa to the PM deposition amount calculating unit 44 and the differential pressure deposition amount time change rate calculating unit 43.

Figure 4:
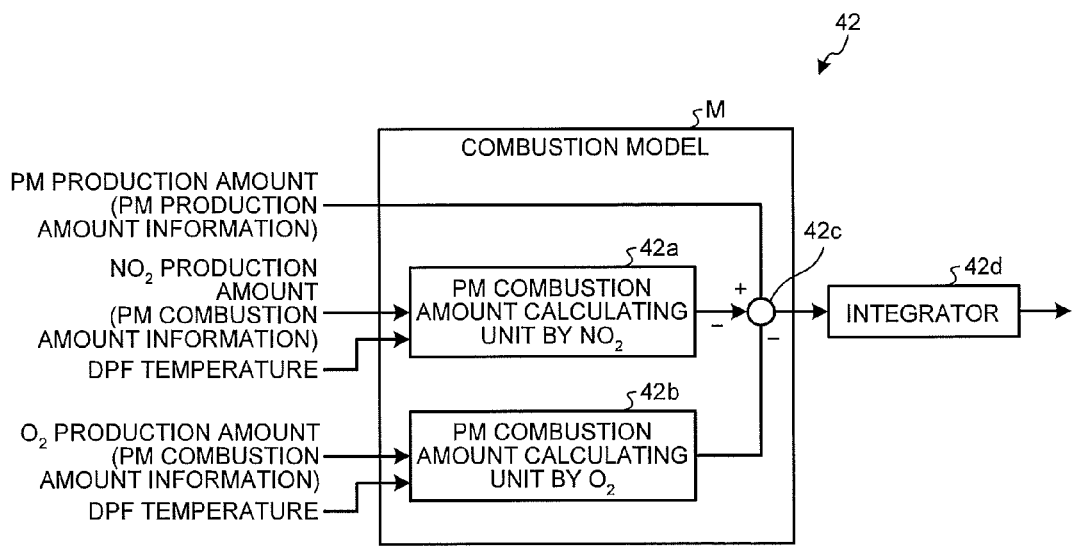
FIG. 4 is a block diagram illustrating a detailed configuration of a model deposition amount calculating unit.

Meanwhile, as illustrated in FIG. 4, the model deposition amount calculating unit 42 receives the PM production amount information and the PM combustion amount information from the engine controller 30 and the DPF temperature from the temperature sensor 74. The engine controller 30 outputs PM production amount information representing a PM production amount inside the exhaust gas estimated based on the fuel injection amount or the fuel efficiency and PM combustion amount information representing an estimated $NO_2$ production amount output from the DOC 71 and an $O_2$ production amount output from the DOC 71 to the model deposition amount calculating unit 42. The model deposition amount calculating unit 42 uses a combustion model M that estimates the PM deposition amount by subtracting the PM combustion amount in the DPF 72 from the PM production amount in the engine. Furthermore, the combustion model M calculates a PM deposition speed.

A PM combustion amount calculating unit 42a by $NO_2$ calculates a PM combustion speed by $NO_2$ using a map corresponding to a reaction speed in which the PM deposited in the DPF 72 is oxidized (burned) by $NO_2$ and which is obtained in advance by the actual measurement based on the DPF temperature and the $NO_2$ production amount input from the engine controller 30. A PM combustion amount calculating unit 42b by $O_2$ calculates a PM combustion speed by $O_2$ using a map corresponding to a reaction speed in which the PM deposited in the DPF 72 is oxidized (burned) by $O_2$ and which is obtained in advance by the actual measurement based on the DPF temperature and the $O_2$ production amount input from the engine controller 30. Here, the PM production amount input from the engine controller 3 is the PM production speed, and a calculator 42c outputs the PM deposition speed obtained by subtracting the PM combustion speed by $NO_2$ and the PM combustion speed by $O_2$ from the PM production speed to an integrator 42d. The integrator 42d integrates the PM deposition amount based on the input PM deposition speed and outputs the integrated PM deposition amount as a model deposition amount PMb to the PM deposition amount calculating unit 44.

Returning to FIG. 2, the PM deposition amount calculating unit 44 calculates a PM deposition amount PMs by applying a weight coefficient to the differential pressure deposition amount PMa input from the differential pressure deposition amount calculating unit 41 and the model deposition amount PMb input from the model deposition amount calculating unit 42. That is, the PM deposition amount PMs may be expressed by the following equation (1) based on the coefficient α (0≤α≤1).

$$PMs = \alpha \cdot PMa + (1-\alpha) \cdot PMb \quad (1)$$

That is, the coefficient α as the weight coefficient applied to the differential pressure deposition amount PMa and the coefficient (1−α) as the weight coefficient applied to the model deposition amount PMb are respectively added so as to be "1". In other words, the distribution ratio between the differential pressure deposition amount PMa and the model deposition amount PMb is determined by the coefficient α. When the coefficient α is 1, the PM deposition amount Ps becomes the value of the differential pressure deposition amount PMa, and when the coefficient α is 0, the PM deposition amount Ps becomes the value of the model deposition amount PMb.

Further, the PM deposition amount calculating unit 44 includes a coefficient determining unit 45 which determines the coefficient α. The coefficient determining unit 45 receives the exhaust gas flow rate information from the engine controller 30 and the DPF temperature from the temperature sensor 24, and calculates the exhaust gas flow rate in the DPF 72 converted and corrected as the DPF temperature. The coefficient α is set to 1 when the value of the exhaust gas flow rate exceeds a predetermined value, QVth, and the coefficient α is set to 0 when the value of the exhaust gas flow rate is less than the predetermined value QVth. Meanwhile, the differential pressure deposition amount time change rate calculating unit 43 calculates a differential pressure deposition amount time change rate ΔPMa as the time change rate of the differential pressure deposition amount input from the differential pressure deposition amount calculating unit 41, and outputs the result to a coefficient correcting unit 46 inside the coefficient determining unit 45. The coefficient determining unit 46 corrects the value of the coefficient α as the coefficient α smaller than the value of the coefficient α when the differential pressure deposition amount time change rate ΔPMa exceeds a threshold value ΔPMath.

Figure 5:
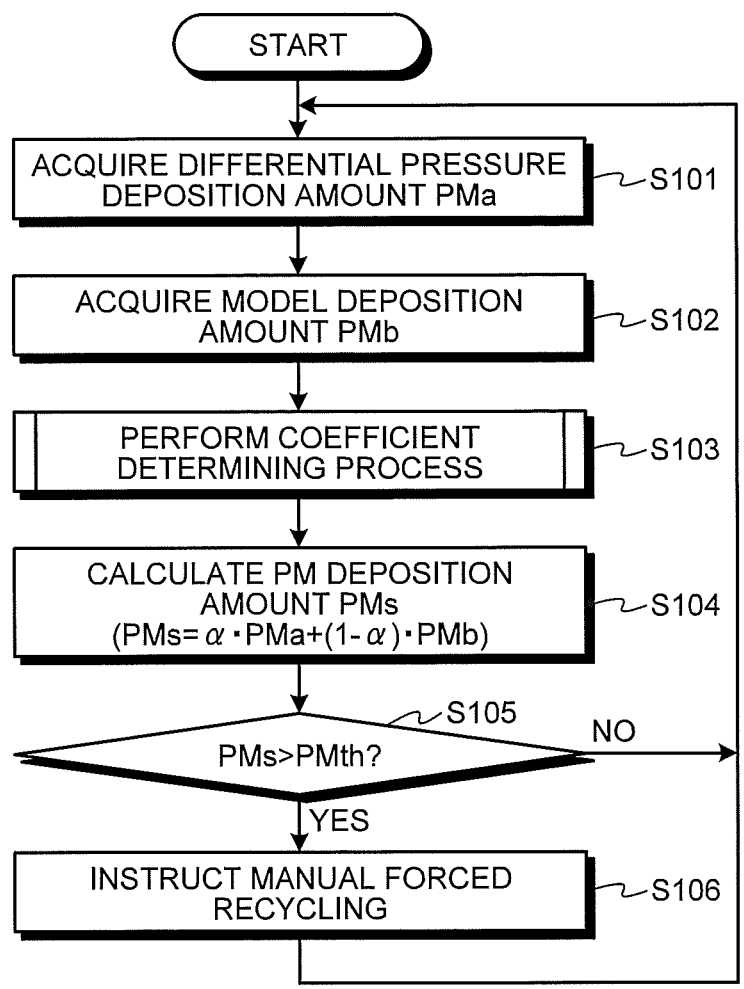
FIG. 5 is a flowchart illustrating a procedure of a PM deposition amount calculating process which is performed by a PM deposition amount calculating unit.

Referring to the flowcharts illustrated in FIGS. 5 and 6, the process procedure of the PM deposition amount calculating unit 44 will be described. First, in FIG. 5, the PM deposition amount calculating unit 44 acquires the differential pressure deposition amount PMa from the differential pressure deposition amount calculating unit 41 (step S101). Further, the PM deposition amount calculating unit 44 acquires the model deposition amount PMb from the model deposition amount calculating unit 42 (step S102). Subsequently, the coefficient determining process for determining the coefficient α is performed by the coefficient determining unit 45 (step S103). Subsequently, the PM deposition amount calculating unit 44 calculates the PM deposition amount PMs in accordance with the equation (1) using the determined coefficient α (step S104). Subsequently, the PM deposition amount calculating unit 44 determines whether the calculated PM deposition amount PMs exceeds a threshold value PMth (step S105). When the PM deposition amount PMs does not exceed the threshold value PMth (No in step S105), the routine proceeds to step S101 so as to repeat the above-described process. Meanwhile, when the PM deposition amount PMs exceeds the threshold value PMth (Yes in step S105), the manual forced regeneration is instructed by the regeneration instruction unit 50 (step S106), and then the routine proceeds to step S101 so as to repeat the above-described process.

Figure 6:
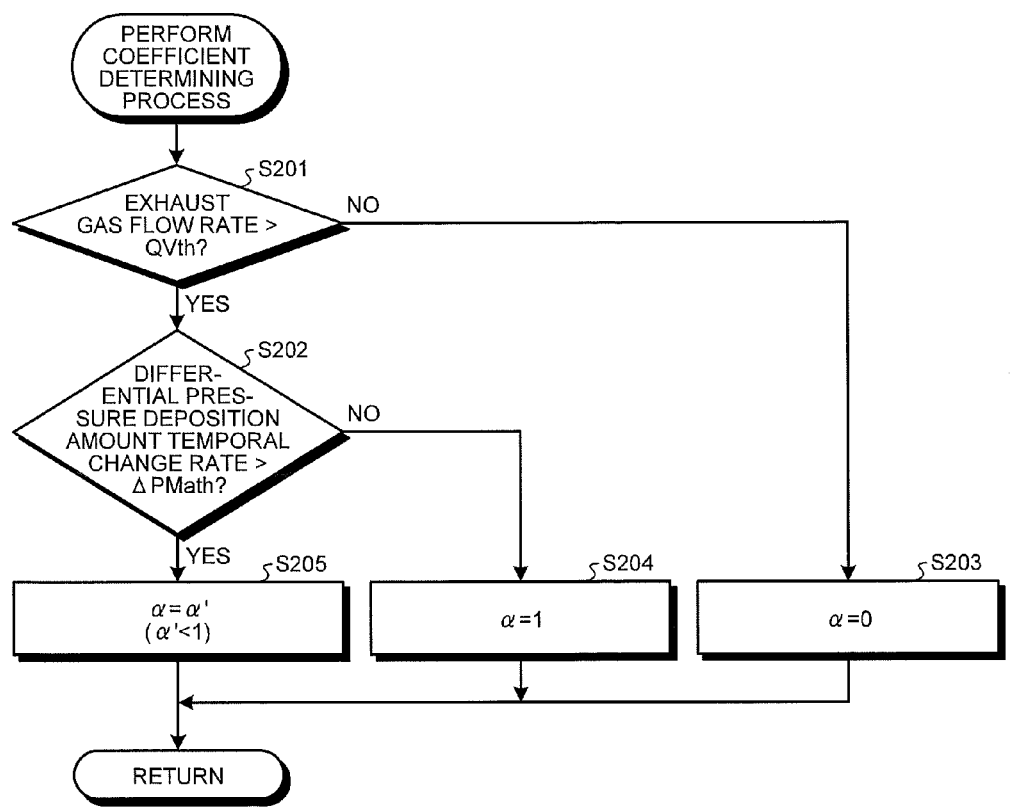
FIG. 6 is a flowchart illustrating a process procedure of a coefficient determining process illustrated in FIG. 5.

The coefficient determining process illustrated in step S103 is performed in accordance with the flowchart illustrated in FIG. 6. That is, the coefficient determining unit 45 first determines whether the exhaust gas flow rate exceeds the predetermined value QVth (step S201). When the exhaust gas flow rate does not exceed the predetermined value QVth (No in step S201), the coefficient α is set to 0 (step S203), and the routine returns to step S103. Meanwhile, when the exhaust gas flow rate exceeds the predetermined value QVth (Yes in step S201), it is determined whether the differential pressure deposition amount time change rate ΔPMa exceeds the threshold value ΔPMath (step S202). When the differential pressure deposition amount time change rate ΔPMa does not exceed the threshold value ΔPMath (No in step S202), the coefficient α is set to 1 (step S204), and the routine returns to step S103. Meanwhile, when the differential pressure deposition amount time change rate ΔPMa exceeds the threshold value ΔPMath (Yes in step S202), the coefficient α is corrected as the coefficient α' smaller than 1 (step S205), and the routine returns to step S103.

Figure 7:
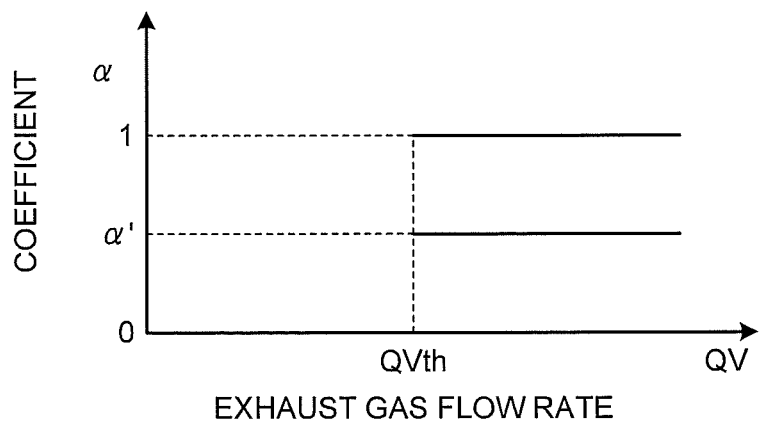
FIG. 7 is a diagram illustrating an exhaust gas flow rate dependence property of a coefficient α.

As a result, the coefficient α is determined as illustrated in FIG. 7. That is, when the exhaust gas flow rate QV is less than the predetermined value QVth, the coefficient α becomes 0. When the exhaust gas flow rate exceeds the predetermined value QVth and the differential pressure deposition amount time change rate ΔPMa is less than the threshold value ΔPMath, the coefficient α becomes 1. When the exhaust gas flow rate exceeds the predetermined value QVth and the differential pressure deposition amount time change rate ΔPMa exceeds the threshold value ΔPMath, the coefficient α is corrected as the coefficient α' smaller than 1.

Figure 8:
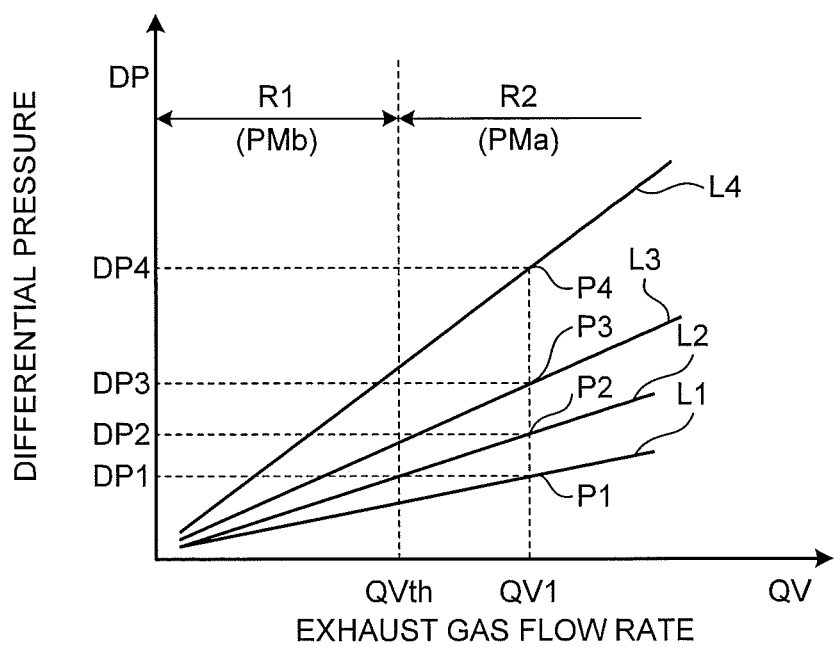
FIG. 8 is a diagram illustrating a range which mainly adopts a differential pressure deposition amount calculation.

Here, the reason why the coefficient α is set to 0 when the exhaust gas flow rate QV is less than the predetermined value QVth (the region R1 illustrated in FIG. 8) is because the estimation precision of the differential pressure deposition amount PMa in the region R1 is low. For this reason, in the region R1, the PM deposition amount PMs is estimated by the model deposition amount PMb by setting the coefficient α to 0. Further, when the exhaust gas flow rate QV exceeds the predetermined value QVth (the region R2 illustrated in FIG. 8), the PM deposition amount PMs is estimated by the differential pressure deposition amount PMa by setting the coefficient α to 1.

Figure 13:
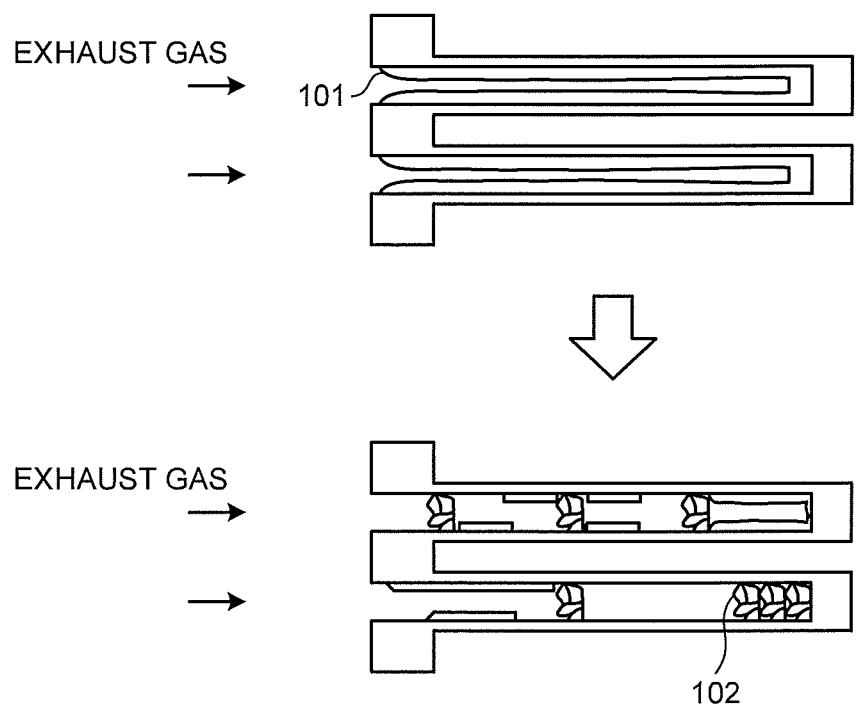
FIG. 13 is a diagram illustrating a state where a cell of a PDF is blocked.

Meanwhile, when the PM deposition amount PMs is estimated by the differential pressure deposition amount PMa by setting the coefficient α to 1 in a case where the exhaust gas flow rate QV exceeds the predetermined value QVth (the region R2 illustrated in FIG. 8), there is a case in which the PM inside the cell of the DPF 72 is detached so that the cell is blocked as illustrated in FIG. 13. In this case, the differential pressure rapidly increases regardless of the actual PM deposition amount so that the PM deposition amount estimation precision considerably degrades and the useless manual forced regeneration is instructed. For this reason, when the differential pressure deposition amount time change rate ΔPMa exceeds the threshold value ΔPMath, the coefficient α is set to the coefficient α' smaller than 1 so as to reduce the influence caused by an increase in the differential pressure deposition amount PMa due to the differential pressure rapidly increasing by the blockage of the cell.

Figure 9:
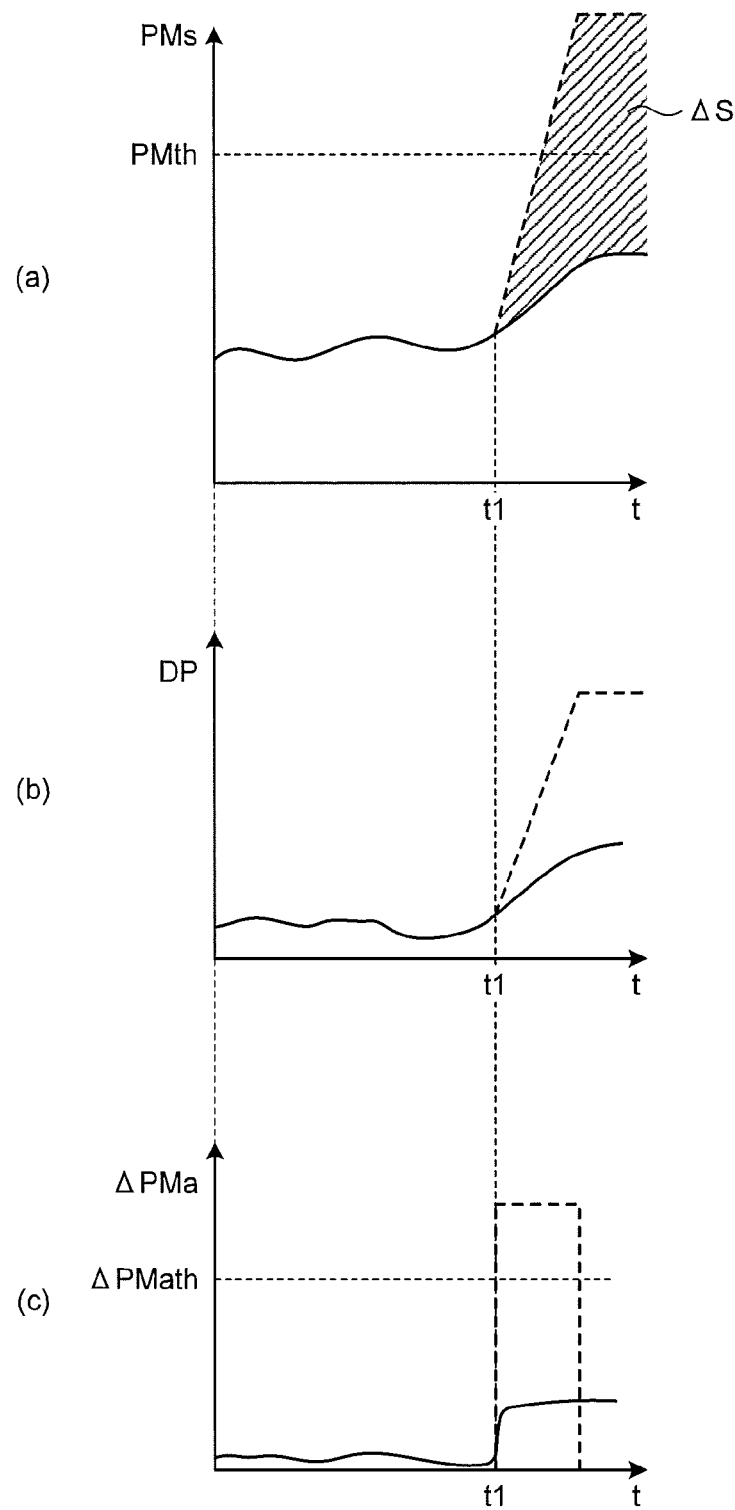
FIG. 9 is a time chart illustrating a change with time in a PM deposition amount, a differential pressure, and a differential pressure deposition amount time change rate when a differential pressure rapidly increases due to a cell blockage of a DPF.

For example, when the cell of the DPF 72 is blocked at the time point t1 illustrated in FIG. 9, the differential pressure DP rapidly increases as indicated by the dashed line portion with the blockage of the cell as illustrated in FIG. 9(b). At this time, as illustrated in FIG. 9(c), the differential pressure deposition amount time change rate ΔPMa exceeds the threshold value ΔPMath like the dashed line portion at the time point t1. In this case, as illustrated in FIG. 9(a), the calculated PM deposition amount PMs exceeds the threshold value PMth for performing the manual forced regeneration instruction. In this case, a large error occurs due to the PM deposition increase amount ΔS corresponding to the diagonal line portion as the difference between the actual PM deposition amount indicated by the solid line and the PM deposition amount indicated by the dashed line of FIG. 9(a). For this reason, the coefficient α is set to the coefficient α' smaller than 1, and the PM deposition increase amount ΔS is decreased, so that the estimation ratio of the model deposition amount PMb is increased and compensated.

Accordingly, in the embodiment, in the region R1 in which the exhaust gas flow rate QV does not exceed the predetermined value QVth, the PM deposition amount PMs is estimated by using the model deposition amount PMb of which the error is smaller than that of the differential pressure deposition amount PMa. In the region R2 in which the exhaust gas flow rate QV exceeds the predetermined value QVth, the PM deposition amount PMs is estimated by using the differential pressure deposition amount PMa with high precision. Further, in the region R2 in which the exhaust gas flow rate QV exceeds the predetermined value QVth, the coefficient α is decreased so as to decrease the error component caused by the differential pressure rapidly increasing due to the blockage of the cell of the DPF 72. Accordingly, it is possible to reliably instruct the manual forced regeneration with high precision and efficiency.

Figure 10:
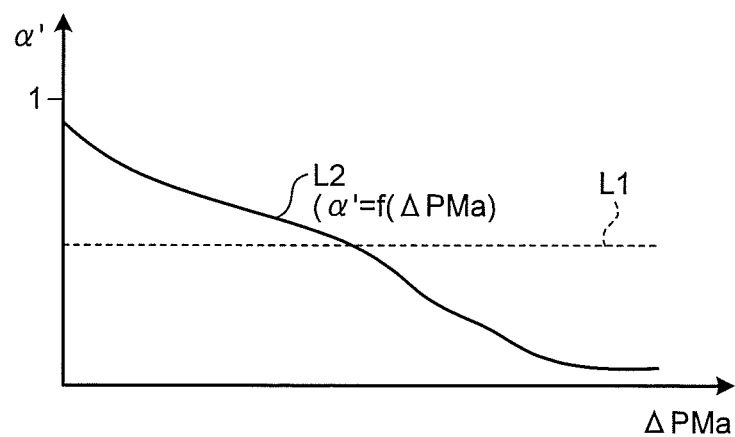
FIG. 10 is a diagram illustrating an example of a function of decreasing a coefficient α' with an increase in differential pressure deposition amount time change rate.

Furthermore, in the above-described embodiment, the coefficient α' is set to a predetermined constant value regardless of a change in the differential pressure deposition amount time change rate ΔPMa (L1 of FIG. 10), but the invention is not limited thereto. For example, the coefficient α' may be set to a function value of the differential pressure deposition amount time change rate ΔPMa. That is, an equation of α'=f (ΔPMa) is established. As indicated by L2 of FIG. 10, the value of the coefficient α' may decrease with an increase in the differential pressure deposition amount time change rate 66 PMa. Accordingly, it is possible to improve the estimation precision using the differential pressure deposition amount PMa as much as possible and to suppress the useless manual forced regeneration instruction. Furthermore, the function of the differential pressure time change rate may be employed instead of the differential pressure deposition amount time change rate ΔPMa.

Figure 11:
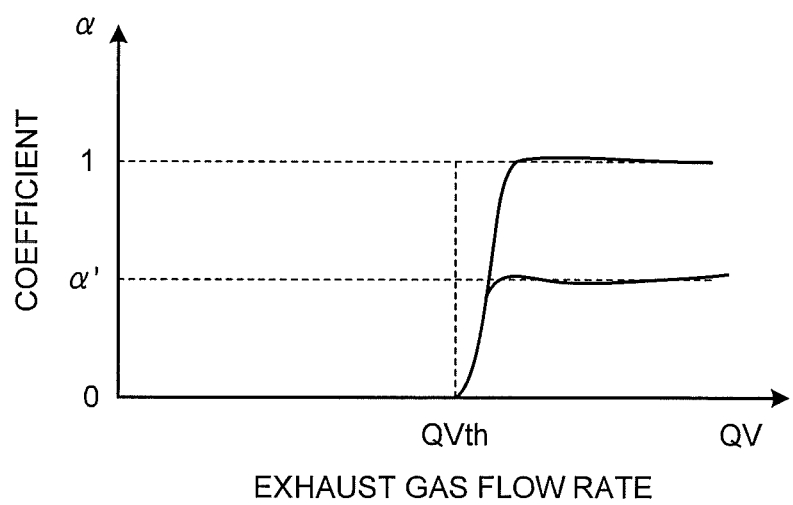
FIG. 11 is a diagram illustrating an example in which a modulation is applied to a coefficient α in the vicinity of a threshold value of an exhaust gas flow rate.

Further, in the above-described embodiment, as illustrated in FIG. 7, the coefficient suddenly changes at the predetermined value QVth of the exhaust gas flow rate QV, but the invention is not limited thereto. For example, as illustrated in FIG. 11, the modulation may be applied so that the coefficient α smoothly changes after exceeding the predetermined value QVth.

Figure 12:
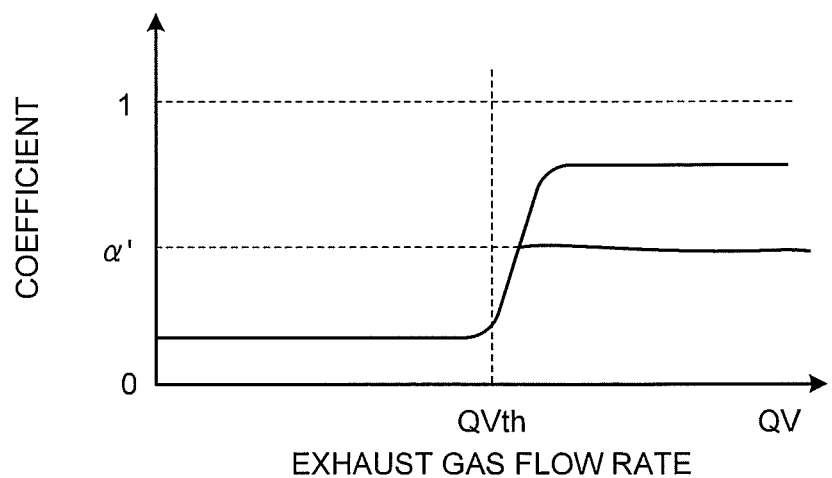
FIG. 12 is a diagram illustrating an example in a case where both a differential pressure deposition amount and a model deposition amount are used when calculating a PM deposition amount.

Moreover, in the above-described embodiment, it is assumed that the coefficient α is set to 0 in the region R1 and the coefficient α is set to 1 in the region R2 when the differential pressure deposition amount time change rate ΔPMa does not rapidly increase, but the invention is not limited thereto. For example, as illustrated in FIG. 12, the model deposition amount PMb is mainly used in the region R1 instead of the coefficient α set to 0 in the region R1, and the differential pressure deposition amount PMa may be mainly used in the region R2 instead of the coefficient α set to 1 in the region R2.

REFERENCE SIGNS LIST 1 engine body
2 air cleaner
3 intake pipe line
4 exhaust pipe line
5 cooling mechanism
6 exhaust turbine supercharger
7 exhaust gas purification device
8 exhaust gas recirculation system
3a engine speed sensor
3c intake pressure sensor
3d exhaust pressure sensor
3e turbine rotation speed sensor
3f flow rate sensor 21 turbine
21a turbine rotor
22 compressor
23 variable turbo nozzle
24 bypassing passageway
30 engine controller
31 exhaust gas recirculation passageway
32 EGR valve
33 EGR cooler
40 regeneration control unit
41 differential pressure deposition amount calculating unit
42 model deposition amount calculating unit
42a PM combustion amount calculating unit by $NO_2$
42b PM combustion amount calculating unit by $O_2$
42c calculator
42d integrator
43 differential pressure deposition amount time change rate calculating unit
44 PM deposition amount calculating unit
45 coefficient determining unit
46 coefficient correcting unit
50 regeneration instruction unit
70 dosing fuel supply device
70a dosing nozzle
71 DOC
72 DPF
73 differential pressure sensor
74 temperature sensor
100 diesel engine

The invention claimed is:

1. A particulate matter deposition amount estimation device comprising:
a differential pressure deposition amount calculating unit which calculates a differential pressure deposition amount obtained by estimating a deposition amount of a particulate matter in a particulate matter removing filter removing the particulate matter from an exhaust gas of an engine based on an exhaust gas flow rate and a differential pressure between an inlet side and an outlet side of the particulate matter removing filter;
a model deposition amount calculating unit which calculates a model deposition amount obtained by estimating the deposition amount of the particulate matter in the particulate matter removing filter using a model in which an amount of the particulate matter burned in the particulate matter removing filter is subtracted from the amount of the particulate matter in the exhaust gas input to the particulate matter removing filter;
a differential pressure deposition amount change rate calculating unit which calculates a time change rate of the differential pressure deposition amount; and
a particulate matter deposition amount calculating unit which sets a value of a first coefficient to be larger than a value of a second coefficient when the exhaust gas flow rate exceeds a predetermined value and amends the first coefficient to be smaller than the set first coefficient when the exhaust gas flow rate exceeds the predetermined value and the time change rate of the differential pressure deposition amount exceeds a predetermined threshold value as a condition in which a sum of the first coefficient and the second coefficient becomes a constant value to calculate the deposition amount of the particulate matter, when the particulate matter deposition amount calculating unit calculates an addition value of a value obtained by multiplying the differential pressure deposition amount by the first coefficient and a value obtained by multiplying the model deposition amount by the second coefficient as the deposition amount of the particulate matter.

2. The particulate matter deposition amount estimation device according to claim 1,
wherein the particulate matter deposition amount calculating unit sets the sum of the first coefficient and the second coefficient to 1, sets the value of the first coefficient to be less than 1 when the exhaust gas flow rate exceeds the predetermined value, and sets the value of the first coefficient to 0 when the exhaust gas flow rate does not exceed the predetermined value.

3. The particulate matter deposition amount estimation device according to claim 1,
wherein the particulate matter deposition amount calculating unit decreases the set first coefficient with an increase in the time change rate of the differential pressure deposition amount when the exhaust gas flow rate exceeds the predetermined value and the time change rate of the differential pressure deposition amount is the predetermined threshold value or more.

4. The particulate matter deposition amount estimation device claim 1,
wherein the particulate matter deposition amount calculating unit outputs an instruction to perform manual forced regeneration to the particulate matter removing filter when the calculated deposition amount of the particulate matter exceeds a threshold value.

5. An exhaust gas purification system comprising:
a particulate matter removing filter which removes a particulate matter from an exhaust gas of an engine;
an engine control unit which controls the engine;
a regeneration control unit which controls regeneration of the particulate matter removing filter;
a differential pressure sensor which detects a differential pressure between an inlet side and an outlet side of the particulate matter removing filter; and
a regeneration instruction unit which outputs an instruction to perform manual forced regeneration to the particulate matter removing filter,
wherein the regeneration control unit includes
a differential pressure deposition amount calculating unit which calculates a differential pressure deposition amount obtained by estimating a deposition amount of the particulate matter in the particulate matter removing filter based on the differential pressure and an exhaust gas flow rate input from the engine control unit,
a model deposition amount calculating unit which calculates a model deposition amount obtained by estimating the deposition amount of the particulate matter in the particulate matter removing filter using a model in which an amount of the particulate matter burned in the particulate matter removing filter is subtracted from the amount of the particulate matter in the exhaust gas input to the particulate matter removing filter,
a differential pressure change rate calculating unit which calculates a time change rate of the differential pressure deposition amount, and
a particulate matter deposition amount calculating unit which sets a value of a first coefficient to be larger than a value of a second coefficient when the exhaust gas flow rate exceeds a predetermined value and amends the first coefficient to be smaller than the set first coefficient when the exhaust gas flow rate exceeds the predetermined value and the time change rate of the differential pressure deposition amount exceeds a predetermined threshold value as a condition in which a sum of the first coefficient and the second coefficient becomes a constant value to calculate the deposition amount of the particulate matter, when the particulate matter deposition amount calculating unit calculates an addition value of a value obtained by multiplying the differential pressure deposition amount by the first coefficient and a value obtained by multiplying the model deposition amount by the second coefficient as the deposition amount of the particulate matter, wherein the particulate matter deposition amount calculating unit outputs an instruction to perform the manual forced regeneration to the regeneration instruction unit when the calculated deposition amount of the particulate matter exceeds a threshold value.

6. The exhaust gas purification system according to claim 5, wherein the regeneration control unit performs the manual forced regeneration through the engine control unit when receiving a manual forced regeneration performing instruction from the regeneration instruction unit.

7. A particulate matter deposition amount estimation method comprising:

calculating a differential pressure deposition amount obtained by estimating a deposition amount of a particulate matter in a particulate matter removing filter removing the particulate matter from an exhaust gas of an engine based on an exhaust gas flow rate and a differential pressure between an inlet side and an outlet side of the particulate matter removing filter;

calculating a model deposition amount obtained by estimating the deposition amount of the particulate matter in the particulate matter removing filter using a model in which an amount of the particulate matter burned in the particulate matter removing filter is subtracted from the amount of the particulate matter in the exhaust gas input to the particulate matter removing filter;

calculating a time change rate of the differential pressure deposition amount; and setting a value of a first coefficient to be larger than a value of a second coefficient when the exhaust gas flow rate exceeds a predetermined value and amending the first coefficient to be smaller than the set first coefficient when the exhaust gas flow rate exceeds the predetermined value and the time change rate of the differential pressure deposition amount exceeds a predetermined threshold value as a condition in which a sum of the first coefficient and the second coefficient becomes a constant value to calculate the deposition amount of the particulate matter, when calculating an addition value of a value obtained by multiplying the differential pressure deposition amount by the first coefficient and a value obtained by multiplying the model deposition amount by the second coefficient as the deposition amount of the particulate matter.

* * * * *